United States Patent
Stachowiak

(10) Patent No.: US 6,890,659 B2
(45) Date of Patent: May 10, 2005

(54) HEAT TREATABLE COATED ARTICLE WITH NIOBIUM ZIRCONIUM INCLUSIVE IR REFLECTING LAYER AND METHOD OF MAKING SAME

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/423,058

(22) Filed: Apr. 25, 2003

(65) Prior Publication Data

US 2004/0214012 A1 Oct. 28, 2004

(51) Int. Cl.$^7$ .............................................. B32B 9/00
(52) U.S. Cl. ...................... 428/428; 428/432; 428/699; 428/704; 428/698; 428/701; 428/472; 428/469
(58) Field of Search ................................. 428/428, 432, 428/433, 697, 698, 699, 701, 702, 704

(56) References Cited

U.S. PATENT DOCUMENTS

| | | |
|---|---|---|
| 3,597,050 A | 8/1971 | Plumat |
| 4,071,649 A | 1/1978 | Jacquemin et al. |
| 4,462,883 A | 7/1984 | Hart |
| 4,894,290 A | 1/1990 | Chesworth et al. |
| 5,059,295 A | 10/1991 | Finley |
| 5,091,244 A * | 2/1992 | Biornard ..................... 428/216 |
| 5,201,926 A | 4/1993 | Szczyrbowski et al. |
| 5,229,194 A | 7/1993 | Lingle et al. |
| 5,318,685 A | 6/1994 | O'Shaughnessy |
| 5,342,675 A | 8/1994 | Kobayashi et al. |
| 5,387,433 A | 2/1995 | Balian et al. |
| 5,395,698 A | 3/1995 | Neuman et al. |
| 5,407,733 A | 4/1995 | Bjornard et al. |
| 5,514,476 A | 5/1996 | Hartig et al. |
| 5,543,229 A | 8/1996 | Ohsaki et al. |
| 5,557,462 A | 9/1996 | Hartig et al. |
| 5,837,108 A | 11/1998 | Lingle et al. |
| 5,935,702 A | 8/1999 | Macquart et al. |
| 5,948,538 A | 9/1999 | Brochot et al. |
| 6,086,210 A | 7/2000 | Krisko et al. |
| 6,352,755 B1 | 3/2002 | Finley et al. |
| 6,475,626 B1 | 11/2002 | Stachowiak |
| 6,495,263 B2 | 12/2002 | Stachowiak |
| 6,514,620 B1 | 2/2003 | Lingle et al. |
| 6,524,714 B1 | 2/2003 | Neuman et al. |
| 6,558,800 B1 | 5/2003 | Stachowiak |
| 6,576,349 B2 | 6/2003 | Lingle et al. |
| 2002/0086164 A1 * | 7/2002 | Anzaki et al. ............... 428/432 |
| 2002/0192473 A1 | 12/2002 | Gentilhomme et al. |

FOREIGN PATENT DOCUMENTS

| | | |
|---|---|---|
| WO | WO 01/21540 | 3/2001 |
| WO | WO 2004/011382 | 2/2004 |

OTHER PUBLICATIONS

U.S. Appl. No. 10/353,088 filed Jan. 29, 2003.
U.S. Appl. No. 10/370,060 filed Feb. 21, 2003.
U.S. Appl. No. 10/406,003 filed Apr. 3, 2003.
"Heat Insulating Glass Which Can Be Thermally Worked", Hironobu, 05124839, Oct. 1991.
U.S. Appl. No. 10/434,470 filed May 9, 2003.

* cited by examiner

Primary Examiner—Archene Turner
Assistant Examiner—G. Blackwell-Rudasill
(74) Attorney, Agent, or Firm—Nixon & Vanderhye P.C.

(57) ABSTRACT

A coated article is provided so as to include a solar control coating having an infrared (IR) reflecting layer sandwiched between at least a pair of dielectric layers. The IR reflecting layer includes NbZr and/or NbZrN$_x$, in certain embodiments of this invention. The use of such materials as an IR reflecting layer(s) enables the coated article to have good corrosion resistance to alkaline solutions, good mechanical performance such as scratch resistance, and/or good color stability (i.e., a low $\Delta E^*$ value(s)) upon heat treatment (HT). The coated article may or may not be heat treated in different embodiment of the invention.

57 Claims, 1 Drawing Sheet

Figure 1:
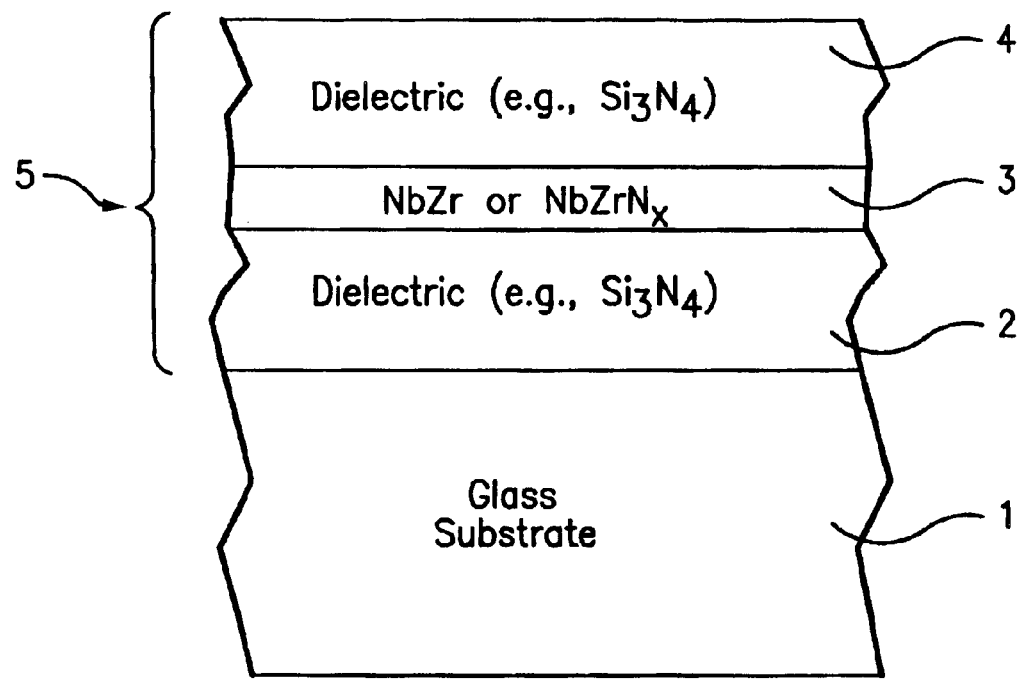

HEAT TREATABLE COATED ARTICLE WITH NIOBIUM ZIRCONIUM INCLUSIVE IR REFLECTING LAYER AND METHOD OF MAKING SAME

This invention relates to coated articles that include at least one niobium zirconium (NbZr) and/or niobium zirconium nitride (NbZrN$_x$) inclusive infrared (IR) reflecting layer, and/or a method of making the same. Such coated articles may be used in the context of monolithic windows, insulating glass (IG) window units, laminated windows, and/or other suitable applications.

BACKGROUND AND SUMMARY OF THE INVENTION

Solar control coatings having a layer stack of glass/Si$_3$N$_4$/NiCr/Si$_3$N$_4$ are known, where the metallic NiCr layer is the sole infrared (IR) reflecting layer in the coating. In certain instances, the NiCr layer may be nitrided. Unfortunately, while such layer stacks with NiCr IR reflecting layers provide efficient solar control and are overall good coatings, they sometimes are lacking in terms of: (a) corrosion resistance to acid (e.g., HCl boil); (b) mechanical performance such as scratch resistance; and/or (c) color stability upon heat treatment for tempering, heat bending, or the like (i.e., too high of ΔE* value(s)). For example, a known heat treatable coated article having a layer stack of glass/Si$_3$N$_4$/NiCr/Si$_3$N$_4$ has rather high glass side reflective ΔE* value above 5.0 after heat treatment (HT) at 625 degrees C. for about ten minutes. This high glass side reflective ΔE* value means that the coated article when HT will not approximately match its non-HT counterpart with respect to glass side reflective color after such HT.

Accordingly, there exists a need in the art for a coated article that has improved characteristics with respect to (a), (b) and/or (c) compared to a conventional layer stack of glass/Si$_3$N$_4$/NiCr/Si$_3$N$_4$, but which still is capable of acceptable thermal performance (e.g., blocking a reasonable amount of IR and/or UV radiation) and/or heat treatment. It is a purpose of this invention to fulfill at least one of the above-listed needs, and/or other needs which will become apparent to the skilled artisan once given the following disclosure.

A recent development by the instant inventor (which is not prior art to the instant application), set forth in U.S. patent application Ser. No. 10/338,878, filed Jan. 9, 2003 (hereby incorporated herein by reference), is the use of a layer stack of glass/Si$_3$N$_4$/NbN$_x$/Si$_3$N$_4$, where the NbN$_x$ is used as the IR reflecting layer. This layer stack is advantageous with respect to the aforesaid glass/Si$_3$N$_4$/NiCr/Si$_3$N$_4$ layer stack in that coated articles with the NbN$_x$ IR reflecting layer realize improved color stability upon heat treatment (i.e., lower ΔE* values) and/or improved durability.

While coated articles having a layer stack of glass/Si$_3$N$_4$/NbN$_x$/Si$_3$N$_4$ represent improvements in the art, they are sometimes lacking with respect to chemical durability. This is because, for example, NbN$_x$, suffers damage when exposed to certain chemicals such as alkaline solutions, e.g., upon exposure to a one hour NaOH boil test for measuring durability. In commercial use, pinholes can form in the outer silicon nitride layer thereby exposing the NbN$_x$ in certain areas; if it is damaged by alkaline solutions this can lead to durability issues. For example, certain photographs in U.S. patent application Ser. No. 10/370,060, filed Feb. 21, 2003 (hereby incorporated herein by reference) illustrate that Nb and NbN$_x$ layers are often damaged by the one hour NaOH boil test (one hour boil in solution including about 0.1 normal NaOH solution—0.4% NaOH mixed with water—at about 195 degrees F.). For the boil test, see ASTM D 1308-87, incorporated herein by reference.

Another recent development is the use of CrN$_x$ as an IR reflecting layer in such a layer stack. Unfortunately, while CrN$_x$ realizes exceptional chemical durability, its thermal performance is not so good.

Moreover, commonly owned 10/370,060 discloses the use of NbCr and NbCrN$_x$ as IR reflecting layers. While NbCr and NbCrN$_x$ both realize excellent durability, there is a trade-off between chemical durability and thermal performance in NbCr and NbCrN$_x$ based coatings. In particular, alloys with higher Cr content have excellent chemical durability, but better thermal performance is achievable for lower Cr contents. Thus, a compromise has to be made between chemical durability and thermal performance when using coatings which utilize NbCr or NbCrN$_x$ IR reflecting layers.

Thus, it will be apparent that there exists a need in the art for coated articles which are capable of achieving acceptable solar control performance, and which are also durable upon exposure to certain chemicals such as acids and/or alkaline solutions (e.g., NaOH boil test).

In certain example embodiments of this invention, a coating or layer system is provided which includes an infrared (IR) reflecting layer comprising niobium zirconium (NbZr) and/or niobium zirconium nitride (NbZrN$_x$) sandwiched between at least a substrate and a dielectric layer. Surprisingly, it has been found that the addition of Zr to Nb causes the resulting coated articles to realize excellent chemical and mechanical durability, and also excellent thermal performance.

For example, the use of NbZr and/or NbZrN$_x$ in IR reflecting layer(s) allows the resulting coated article(s) to achieve at least one of: (a) improved corrosion resistance to alkaline solutions such as NaOH (compared to layer stacks of glass/Si$_3$N$_4$/Nb/Si$_3$N$_4$ and glass/Si$_3$N$_4$/NbN$_x$/Si$_3$N$_4$); (b) good thermal performance comparable to that of Nb and NbN$_x$; (c) good mechanical performance such as scratch resistance; and/or (d) good color stability upon heat treatment (e.g., lower ΔE* value(s) than coated articles with layer stacks of glass/Si$_3$N$_4$/NiCr/Si$_3$N$_4$).

Due to its spectral selectivity, niobium zirconium (NbZr) and niobium zirconium nitride (NbZrN$_x$) provide thermal performance (e.g., IR blocking) similar to or better than NiCr and NbN$_x$, but are surprisingly more durable than both NiCr and NbN$_x$. Moreover, it has surprisingly been found that in certain example instances the use of NbZr and/or NbZrN$_x$ in/as an IR reflecting layer(s) enables the solar control coating to have significantly improved color stability upon HT (e.g., a lower ΔE* value with a given HT time) than the aforesaid conventional coating where metallic NiCr is used as the IR reflecting layer.

A coated article according to an example embodiment of this invention utilizes such a NbZr and/or NbZrN$_x$ IR reflecting layer(s) sandwiched between at least a pair of dielectric layers of a material(s) such as silicon nitride or the like. In certain example embodiments of this invention, the NbZr and/or NbZrN$_x$ layer is not in contact with any metallic IR reflecting layer (e.g., is not in contact with any Ag or Au layer).

In certain example embodiments of this invention, heat treated (HT) coated articles including a NbZr and/or NbZrN$_x$ inclusive IR reflecting layer(s) have a glass side reflective ΔE* value due to heat treatment of no greater than 5.0, more preferably no greater than 4.0, even more preferably no greater than 3.0, still more preferably no greater than 2.5. For purposes of example, the heat treatment (HT) may be for at least about 5 minutes at a temperature(s) of at least about 580 degrees C.

In certain example embodiments of this invention, the Zr:Nb ratio (atomic %) in the NbZr and/or NbZrN$_x$ inclusive IR reflecting layer(s) may be from about 0.001 to 1.0, more preferably from about 0.001 to 0.60, and even more preferably from about 0.004 to 0.50. In certain example embodiments, the IR reflecting layer comprising NbZr and/or NbZrN$_x$, may include from about 0.1 to 60% Zr, more preferably from about 0.1 to 40% Zr, even more preferably from 0.1 to 20%, still more preferably from 0.1 to 15%, more preferably from about 0.4 to 15% Zr, and most preferably from 5 to 12% Zr (atomic %). These Zr ranges apply to both metallic and nitrided NbZr layers, but are preferably with respect to substantially metallic layer. When significantly nitrided, higher amounts of Zr could be beneficial.

Optionally, a protective overcoat of a material such as zirconium oxide may also be provided in certain example embodiments.

Generally speaking, certain example embodiments of this invention fulfill one or more of the above listed needs by providing a coated article including a coating supported by a glass substrate, the coating comprising: a first dielectric layer; a layer comprising NbZr and/or a nitride of NbZr; a second dielectric layer, wherein said layer comprising NbZr and/or a nitride of NbZr is located between at least the first and second dielectric layers; and wherein said layer comprising NbZr and/or a nitride of NbZr does not contact any metallic infrared (IR) reflecting layer of Ag or the like.

In certain example embodiments of this invention, there is provided a coated article including a layer system supported by a substrate, the layer system comprising: a first dielectric layer; a layer comprising niobium zirconium provided on the substrate over at least the first dielectric layer; and a second dielectric layer provided on the glass substrate over at least the layer comprising niobium zirconium. The layer comprising niobium zirconium may or may not be nitrided in different embodiments of this invention.

IN THE DRAWINGS

FIG. 1 is a partial cross sectional view of an embodiment of a monolithic coated article (heat treated or not heat treated) according to an example embodiment of this invention.

DETAILED DESCRIPTION OF CERTAIN EXAMPLE EMBODIMENTS OF THE INVENTION

Certain embodiments of this invention provide coated articles that may be used in windows such as monolithic windows (e.g., vehicle, residential, and/or architectural windows), IG window units, and/or other suitable applications. Certain example embodiments of this invention provide a layer system that is characterized by at least one of: (a) good corrosion resistance to acids, and alkaline solutions such as NaOH; (b) good thermal performance such as blocking of significant amounts of IR and/or UV radiation; (c) good mechanical performance such as scratch resistance; and/or (d) good color stability upon heat treatment (i.e., low $\Delta E^*$ value(s)). With respect to color stability upon heat treatment (HT), this means a low value of $\Delta E^*$; where $\Delta$ is indicative of a*, b* and L* change in view of HT such as thermal tempering, heat bending, or thermal heat strengthening, monolithically and/or in the context of dual pane environments such as IG units or laminates.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first optional dielectric layer 2 (e.g., of or including silicon nitride (e.g., $Si_3N_4$), tin oxide, or some other suitable dielectric such as a metal oxide and/or nitride), infrared (IR) reflecting layer 3 of or including niobium zirconium (NbZr) and/or a nitride of niobium zirconium (NbZrN$_x$), and second dielectric layer 4 (e.g., of or including silicon nitride (e.g., $Si_3N_4$), tin oxide, or some other suitable dielectric such as a metal oxide and/or nitride). In certain alternative embodiments, the bottom dielectric layer 2 may be omitted so that the IR reflecting layer 3 is located in contact with the glass substrate.

Optionally, a protective overcoat of or including a material such as zirconium oxide (not shown) may be provided over layers 2–4 in certain example embodiments of this invention. Example protective overcoats comprising silicon nitride, zirconium oxide and/or chromium oxide which may be optionally be used in certain example embodiments of this invention are described in U.S. patent application Ser. No. 10/406,003, filed Apr. 3, 2003, the disclosure of which is hereby incorporated herein by reference.

In certain example embodiments of this invention, coating 5 optionally may not include any metallic IR blocking or reflecting layer of Ag or Au. In such embodiments, NbZr and/or NbZrN$_x$ IR reflecting layer(s) 3 may be the only IR reflecting layer in coating 5, although multiple such layers may be provided in certain instances. In certain example embodiments of this invention, NbZr and/or NbZrN$_x$ IR reflecting layer 3 reflects at least some IR radiation. In certain example embodiments, it is possible for the NbZr and/or NbZrN$_x$ layer 3 to include other materials such as dopants.

Overall coating 5 includes at least layers 24. It is noted that the terms "oxide" and "nitride" as used herein include various stoichiometries. For example, the term silicon nitride includes stoichiometric $Si_3N_4$, as well as non-stoichiometric silicon nitride. Layers 2–4 may be deposited on substrate 1 via magnetron sputtering, any other type of sputtering, or via any other suitable technique in different embodiments of this invention.

Surprisingly, it has been found that the use of Zr and Nb in IR reflecting layer 3 allows the resulting coated article to realize excellent chemical and mechanical durability, and also good thermal performance. For example, the use of NbZr and/or NbZrN$_x$, in IR reflecting layer(s) 3 allows the resulting coated article(s) to achieve: (a) improved corrosion resistance to alkaline solutions such as NaOH (compared to layer stacks of glass/$Si_3N_4$/$Si_3N_4$ and glass/$Si_3N_4$/NbN$_x$/$Si_3N_4$); (b) excellent thermal performance comparable to that of Nb and NbN$_x$; (c) good mechanical performance such as scratch resistance; and/or (d) good color stability upon heat treatment (e.g., lower $\Delta E^*$ value(s) than coated articles with layer stacks of glass/$Si_3N_4$/NiCr/$Si_3N_4$). It has surprisingly been found that in certain example instances, the use of NbZr instead of Nb allows for a lower $\Delta E^*$ value(s); in certain example embodiments, $\Delta E^*$ value(s) no greater than 2.0 may be achieved with such values becoming lower with more Zr content.

In certain example embodiments, the Zr:Nb ratio (atomic %) in the NbZr and/or NbZrN$_x$ inclusive IR reflecting layer(s) may be from about 0.001 to 1.0, more preferably from about 0.001 to 0.60, and even more preferably from about 0.004 to 0.50. In certain example embodiments, the IR reflecting layer comprising NbZr and/or NbZrN$_x$ may include from about 0.1 to 60% Zr, more preferably from about 0.1 to 40% Zr, even more preferably from 0.1 to 20%, still more preferably from 0.1 to 15%, more preferably from about 0.4 to 15% Zr, and most preferably from 5 to 12% Zr (atomic %). These Zr ranges apply to both metallic and nitrided NbZr layers, but are preferably with respect to substantially metallic layer. When significantly nitrided, higher amounts of Zr could be beneficial. Surprising durability improvement has been observed even for very low Zr contents determined to be less than 0.44 atomic % (Zr/Nb ratio of 0.00438), while at the same time thermal performance is comparable to the use of Nb.

In embodiments where the IR reflecting layer 3 is of or includes NbZrN$_x$ (i.e., a nitride of NbZr), the ratio in the layer of nitrogen to the total combination of Nb and Zr may be represented, in certain example embodiments, by (Nb+Zr)$_x$N$_y$, where the ratio y/x (i.e., the ratio of N to Nb+Zr) is from 0.2 to 0.9, even more preferably from 0.3 to 0.8, still more preferably from 0.4 to 0.7.

While FIG. 1 illustrates coating 5 in a manner where NbZr and/or NbZrN$_x$ layer 3 is in direct contact with dielectric layers 2 and 4, and wherein layer 3 is the only IR reflecting layer in the coating, the instant invention is not so limited. Other layer(s) may be provided between layers 2 and 3 (and/or between layers 3 and 4) in certain other embodiments of this invention. Moreover, other layer(s) (not shown) may be provided between substrate 1 and layer 2 in certain embodiments of this invention; and/or other layer(s) (not shown) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even when other layer(s) (not shown) are provided therebetween (i.e., the terms "on" and "supported by" as used herein are not limited to directly contacting). Also, more than one NbZr and/or NbZrN$_x$ IR reflecting layer may be provided in alternative embodiments of this invention.

In certain example embodiments of this invention, dielectric antireflection layer 2 may have an index of refraction "n" of from 1.7 to 2.7, more preferably from 1.9 to 2.5 in certain embodiments, while layer 4 may have an index of refraction "n" of from about 1.4 to 2.5, more preferably from 1.9 to 2.3. Meanwhile, layer 3 may have an index "n" of from about 2.0 to 3.0, more preferably from 2.2 to 2.8, and most preferably from 2.4 to 2.7; and may have an extinction coefficient "k" of from 2.0 to 3.5, more preferably from 2.4 to 3.2, and most preferably from 2.5 to 3.0. In embodiments of this invention where layers 2 and/or 4 comprise silicon nitride (e.g., Si$_3$N$_4$), sputtering targets including Si employed to form these layers may or may not be admixed with up to 1–40% by weight aluminum or stainless steel (e.g. SS#316), with about this amount then appearing in the layers so formed. Even with this amount(s) of aluminum and/or stainless steel, such layers 2 and 4 are still considered dielectric layers herein.

While FIG. 1 illustrates a coated article according to an embodiment of this invention in monolithic form, coated articles according to other embodiments of this invention may comprise IG (insulating glass) window units. In IG embodiments, coating 5 from FIG. 1 may be provided on the inner wall of the outer substrate of the IG unit, and/or on the inner wall of the inner substrate, or in any other suitable location in other embodiments of this invention.

Turning back to FIG. 1, various thicknesses may be used consistent with this invention. According to certain non-limiting example embodiments of this invention, example thicknesses and materials for the respective layers 2–4 on the glass substrate 1 are as follows:

TABLE 1

(Example non-limiting thicknesses)

| Layer | Example Range (Å) | Preferred (Å) | Best (Å) |
|---|---|---|---|
| silicon nitride (layer 2): | 0–1,500 Å | 20–1300 Å | 50–1200 Å |
| NbZr or NbZrN$_x$ (layer 3): | 30–700 Å | 100–500 Å | 120–350 Å |
| silicon nitride (layer 4): | 10–900 Å | 100–800 Å | 150–500 Å |

In certain exemplary embodiments, the color stability with HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The value(s) ΔE* is important in determining whether or not there is matchability, or substantial color matchability upon HT, in the context of certain embodiments of this invention (i.e., the term ΔE* is important in determining color stability upon HT). Color herein is described by reference to the conventional a*, b* values. For example, the term Δa* is indicative of how much color value a* changes due to HT. The term ΔE* (and ΔE) is well understood in the art. The definition of the term ΔE* may be found, for example, in WO 02/090281 and/or U.S. Pat. No. 6,475,626, the disclosures of which are hereby incorporated herein by reference. In particular, ΔE* corresponds to the CIE LAB Scale L*, a*, b*, and is represented by:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (or coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values a$_h$, b$_h$, L$_h$. Also within the scope of this invention and the quantification of ΔE* are the equivalent numbers if converted to those calculated by any other technique employing the same concept of ΔE* as defined above.

Before heat treatment (HT) such as thermal tempering, in certain example embodiments of this invention coated articles have color characteristics as follows in Table 2 (monolithic and/or IG unit). It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided. Table 3 set forth below illustrates certain characteristics of coated articles according to certain example embodiments of this invention after HT such as thermal tempering (monolithic and/or IG units)—the characteristics below in Table 2 (non-HT) are also applicable to HT coated articles herein, except for the additions set forth in Table 3.

TABLE 2

Color/Optical Characteristics (non-HT)

| | General | Preferred | Most Preferred |
|---|---|---|---|
| $T_{vis}$ (TY): | 6–80% | 10–50% | 12–30% |
| $L^*_T$ | 34–92 | 37–76 | 41–62 |
| $a^*_T$ | −6 to +6 | −4 to +3 | −3 to +2 |
| $b^*_T$ | −20 to +20 | −15 to +10 | −10 to +10 |
| $R_GY$ (glass side): | 8–50% | 10–40% | 12–30% |
| $L^*_G$ | 34–76 | 37–70 | 41–65 |
| $a^*_G$ | −6 to +6 | −4 to +3 | −3 to +2 |
| $b^*_G$ | −30 to +20 | −25 to +10 | −20 to +10 |
| $R_FY$ (film side): | 8–50% | 8–40% | 12–35% |
| $L^*_F$ | 34–76 | 37–70 | 41–68 |
| $a^*_F$ | −9 to +9 | −6 to +6 | −5 to +5 |
| $b^*_F$ | −40 to +40 | −30 to +30 | −20 to +30 |
| $T_{sol}$ (TS %): | 5–50% | 5–30% | 5–25% |
| SC: | <=0.5 | <=0.45 | <=0.40 |
| SHGC: | <=0.45 | <=0.40 | <=0.35 |
| $T_{UV}$: | <=40% | <=35% | <=25% |
| $R_s$ (Ω/sq): | <250 | <100 | <60 |

TABLE 3

Color/Optical Characteristics (after HT; in addition to Table 2)

| | General | Preferred | Most Preferred |
|---|---|---|---|
| $\Delta E^*_G$ | <=5.0 | <=3.0 | <=2.5 |
| $\Delta E^*_T$ | <=5.0 | <=3.0 | <=2.5 |
| $\Delta a^*_G$ | <=2.5 | <=1.0 | <=0.8 |
| $\Delta b^*_G$ | <=4.0 | <=2.0 | <=0.6 |
| $\Delta L^*_G$ | <=10 | <=5 | <=3 |

Coated articles herein may even have a glass side reflective $\Delta E^*$ value ($\Delta E^*_G$) of no greater than 2.0 in certain instances.

For purposes of example only, a plurality of examples representing different example embodiments of this invention are set forth below.

EXAMPLES

Examples 1–2 were monolithic coated articles (each ultimately annealed and heat treated, although not all embodiments herein need be HT), with the layer stack as shown in FIG. 1. The $Si_3N_4$ layers 2 and 4 in each example were deposited by sputtering a silicon target (doped with about 10% Al) in an atmosphere including nitrogen and argon gases. The NbZr IR reflecting layer 3 in each example was deposited by sputtering a target of about 90% Nb and about 10% Zr in an atmosphere including argon gas. For Example 1, the following sputtering process parameters were used in depositing the coating. Line speed is in inches per minute (IPM), and gas (Ar and N) flows were in units of sccm:

TABLE 4

Example 1 Coating Process Parameters

| Layer | Power | Voltage | Line Speed | # Passes | Ar flow | N flow |
|---|---|---|---|---|---|---|
| SiN layer 2: | 2.5 kW | 485 V | 37.4 | 6 | 40 | 55 |
| NbZr layer 3: | 1.0 kW | 368 V | 32 | 1 | 30 | 0 |
| SIN layer 4: | 2.5 kW | 486 V | 47 | 2 | 40 | 55 |

For Example 2, the following sputtering process parameters were used in depositing the coating. Again, line speed is in inches per minute (IPM), and gas flows were in units of sccm:

TABLE 5

Example 2 Coating Process Parameters

| Layer | Power | Voltage | Line Speed | # Passes | Ar flow | N flow |
|---|---|---|---|---|---|---|
| SiN layer 2: | 2.5 kW | 485 V | 42.8 | 2 | 40 | 55 |
| NbZr layer 3: | 1.0 kW | 369 V | 31 | 1 | 30 | 0 |
| SIN layer 4: | 2.5 kW | 484 V | 32.9 | 2 | 40 | 55 |

It is noted that each of these Examples could easily have been transformed into an $NbZrN_x$ embodiment by merely turning on an appropriate amount of nitrogen gas flow during the sputtering deposition of the IR reflecting layer 3.

After being sputtered, Examples 1–2 had the following characteristics (annealed and non-HT, monolithic) (Ill. C, 2 degree observer):

TABLE 6

Characteristics (non-HT)

| Parameter | Ex. 1 | Ex. 2 |
|---|---|---|
| $T_{vis}$ (TY) (transmission): | 19.4% | 20.9% |
| $a^*_T$ | −1.5 | −1.4 |
| $b^*_T$ | 3.9 | −4.9 |
| $L^*_T$ | 51.2 | 52.9 |
| $R_GY$ (glass side refl. %): | 19.0% | 30.8% |
| $a^*_G$: | −0.7 | −2.9 |
| $b^*_G$: | −19.2 | −0.9 |
| $L^*_G$: | 50.7 | 62.3 |
| $R_FY$ (film side refl. %): | 38.1% | 22.3% |
| $a^*_F$: | 0.2 | 0.4 |
| $b^*_F$: | 14.5 | 23.4 |
| $L^*_F$: | 68.1 | 54.4 |
| $T_{sol}$ (TS): | 15% | 15% |
| Shading Coefficient (SC): | 0.366 | 0.335 |
| SHGC: | 0.315 | 0.288 |
| $T_{uv}$ (UV transmission): | 11% | 16.5% |
| Emissivity (hemispherical): | 0.36 | 0.34 |
| $R_s$ (sheet resistance; ohms/sq.): | 49.7 | 45.1 |

Each of Examples 1–2 had a layer stack as follows, set forth in Table 7. The thicknesses and stoichiometries listed below in Table 7 for the Examples 1–2 are approximations and are not exact. The coating 5 for each Example is shown in FIG. 1, and thus includes layers 2, 3 and 4. The glass substrates were clear and about 6 mm thick in each Example.

TABLE 7

Coatings in Examples

| | |
|---|---|
| Example 1: | Glass/Si$_3$N$_4$ (850 Å)/NbZr (190 Å)/Si$_3$N$_4$ (210 Å) |
| Example 2: | Glass/Si$_3$N$_4$ (190 Å)/NbZr (200 Å)/Si$_3$N$_4$ (300 Å) |

Both Examples were then evaluated and tested for durability, showing excellent performance in standard mechanical and chemical tests as coated and after HT. For example, the Teledyne scratch test with a 500 gm load did not produce noticeable scratches on either sample. A taber abrasion test after 500 revolutions was also passed. A one hour NaOH boil test was also passed although some changes in color were observed. When a zirconium oxide overcoat was provided, the NaOH boil test was passed in an improved fashion.

After being sputter coated, Examples 1–2 (as in Tables 4–7 above with no ZrO overcoat) were heat treated for 10 minutes at about 625 degrees C. Table 8 below sets forth certain color stability characteristics of Examples 1–2 upon/after such heat treatment (HT).

TABLE 8

Glass Side Reflective Color Stability Upon HT

| Parameter | Example 1 | Example 2 |
|---|---|---|
| ΔE*$_G$: | 1.7 | 2.5 |

As can be seen from Table 8, Examples 1–2 were characterized by excellent glass side reflective ΔE* values (the lower the better). These low values illustrate how little the glass side reflective optical characteristics of the coating change upon HT. This is indicative of superior color stability upon heat treatment. Additionally, it has been found in other NbZr examples similar to Examples 1–2 but having higher Zr content of about 10% in layer 3 that glass side reflective ΔE* is from about 1.9 to 2.0.

For purposes of comparison, consider the following layer stack: glass/Si$_3$N$_4$/NiCr/Si$_3$N$_4$, which has a glass side reflective ΔE* value of above 5.0 after heat treatment (HT) at 625 degrees C. for ten minutes. Examples 1–2 above clearly illustrate the comparative advantage of using niobium zirconium, as opposed to NiCr, for the IR reflecting layer (a much lower glass side reflective ΔE* value is achievable).

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as R$_X$Y (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance (T$_{UV}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380–720 nm; near-infrared is 720–2500 nm; ultraviolet is 300–380 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C.,2 degree observer.

Another term employed herein is "sheet resistance". Sheet resistance (R$_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

The terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 or 600 degrees C. for a sufficient period to enable tempering and/or heat strengthening. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a substrate, the layer system comprising:
   a first dielectric layer;
   a layer comprising niobium zirconium provided on the substrate over at least the first dielectric layer;
   a second dielectric layer provided on the substrate over at least the layer comprising niobium zirconium; and
   wherein the layer comprising niobium zirconium has an index of refraction "n" of from 2.0 to 3.0, an extinction coefficient "k" of from 2.0 to 3.5, and comprises from about 0.1 to 60% Zr.

2. The coated article of claim 1, wherein the layer comprising niobium zirconium is sandwiched between and contacts each of the first and second dielectric layers.

3. The coated article of claim 1, wherein each of the dielectric layers comprises at least one of a nitride and a metal oxide.

4. The coated article of claim 1, wherein at least one of the first and second dielectric layers comprises silicon nitride.

5. The coated article of claim 1, wherein each of the first and second dielectric layers comprises silicon nitride.

6. The coated article of claim 1, wherein a contact or nucleation layer is provided between the layer comprising niobium zirconium and the first dielectric layer.

7. The coated article of claim 1, wherein a contact or nucleation layer is provided between the layer comprising niobium zirconium and the second dielectric layer.

8. The coated article of claim 1, wherein the coated article has a visible transmission from about 6 to 80%.

9. The coated article of claim 1, wherein the coated article has a visible transmission of from about 10–50%.

10. The coated article of claim 1, wherein the coated article has a visible transmission of from about 12–30%.

11. The coated article of claim 1, wherein the coated article is a window.

12. The coated article of claim 1, wherein the layer system has a sheet resistance ($R_s$) of less than 250 ohms/square.

13. The coated article of claim 1, wherein the layer system has a sheet resistance ($R_s$) of less than 100 ohms/square.

14. The coated article of claim 1, wherein the layer system has a sheet resistance ($R_s$) of less than 60 ohms/square.

15. A coated article including a layer system supported by a substrate, the layer system comprising:
   a first dielectric layer;
   a layer comprising niobium zirconium provided on the substrate over at least the first dielectric layer;
   a second dielectric layer provided on the substrate over at least the layer comprising niobium zirconium; and
   wherein the layer system further comprises an overcoat comprising zirconium oxide.

16. The coated article of claim 1, wherein the layer comprising niobium zirconium is nitrided.

17. A coated article including a layer system supported by a substrate, the layer system comprising:
   a first dielectric layer;
   a layer comprising niobium zirconium provided on the substrate over at least the first dielectric layer;
   a second dielectric layer provided on the substrate over at least the layer comprising niobium zirconium; and
   wherein the layer comprising niobium zirconium is nitrided so as to be represented by $(Nb+Zr)_xN_y$, where the ratio y/x is from 0.2 to 0.9.

18. The coated article of claim 17, wherein the ratio y/x is from 0.3 to 0.8.

19. A coated article including a layer system supported by a substrate, the layer system comprising:
   a first dielectric layer;
   a layer comprising niobium zirconium provided on the substrate over at least the first dielectric layer;
   a second dielectric layer provided on the substrate over at least the layer comprising niobium zirconium; and
   wherein in the layer comprising niobium zirconium the ratio of zirconium to niobium (Zr/Nb) is from about 0.001 to 1.0.

20. The coated article of claim 19, wherein in the layer comprising niobium zirconium the ratio of zirconium to niobium (Zr/Nb) is from about 0.001 to 0.60.

21. The coated article of claim 19, wherein in the layer comprising niobium zirconium the ratio of zirconium to niobium (Zr/Nb) is from about 0.004 to 0.50.

22. A coated article including a layer system supported by a substrate, the layer system comprising:
   a first dielectric layer;
   a layer comprising niobium zirconium provided on the substrate over at least the first dielectric layer;
   a second dielectric layer provided on the substrate over at least the layer comprising niobium zirconium; and
   wherein the layer comprising niobium zirconium includes from about 0.1 to 60% zirconium.

23. The coated article of claim 22, wherein the layer comprising niobium zirconium includes from about 0.4 to 10% zirconium.

24. The coated article of claim 1, wherein the coated article is heat treated and has a ΔE* value (glass side reflective) of no greater than 5.0 after and/or due to heat treatment.

25. The coated article of claim 1, wherein the coated article is heat treated and has a ΔE* value (glass side reflective) of no greater than 4.0 after and/or due to heat treatment.

26. The coated article of claim 1, wherein the coated article is heat treated and has a ΔE* value (glass side reflective) of no greater than 3.0 after and/or due to heat treatment.

27. The coated article of claim 1, wherein the layer system consists essentially of the first and second dielectric layers and the layer comprising niobium zirconium.

28. The coated article of claim 1, wherein the layer comprising niobium zirconium is metallic.

29. The coated article of claim 1, wherein the coated article has no metallic infrared (IR) reflecting layer comprising Ag or Au.

30. The coated article of claim 1, wherein the coated article comprises an IG window unit, a monolithic window, or a laminated window.

31. The coated article of claim 1, wherein the layer comprising niobium zirconium is substantially free of any oxide.

32. The coated article of claim 1, wherein at least one of the dielectric layers comprises silicon nitride and includes from 6–20% aluminum and/or stainless steel.

33. The coated article of claim 1, wherein the layer comprising niobium zirconium does not contact any metallic infrared (IR) reflecting layer comprising Ag or Au.

34. The coated article of claim 1, wherein the coated article is not heat treated.

35. The coated article of claim 1, wherein the substrate is a glass substrate.

36. A coated article including a layer system supported by a glass substrate, the layer system comprising:

a layer comprising niobium zirconium supported by the substrate; and wherein the layer comprising niobium zirconium has an index of refraction "n" of from 2.6 to 3.0, an extinction coefficient "k" of from 2.0 to 3.5, and comprises from about 0.1 to 60% Zr.

37. The coated article of claim 36, wherein the layer comprising niobium zirconium comprises from 0.1 to 20% Zr.

38. The coated article of claim 36, wherein the layer comprising niobium zirconium comprises from 0.4 to 15% Zr.

39. The coated article of claim 36, wherein the layer comprising niobium zirconium is located between at least first and second nitride and/or metal oxide layers.

40. The coated article of claim 36, wherein the coated article has a visible transmission from about 6 to 80%.

41. The coated article of claim 36, wherein the coated article has a visible transmission of from about 10–50%.

42. The coated article of claim 36, wherein the coated article has a visible transmission of from about 12–30%.

43. The coated article of claim 36, wherein the coated article is a window.

44. The coated article of claim 36, wherein the layer system has a sheet resistance ($R_s$) of less than 250 ohms/square.

45. The coated article of claim 36, wherein the layer system has a sheet resistance ($R_s$) of less than 100 ohms/square.

46. The coated article of claim 36, wherein the layer system has a sheet resistance ($R_s$) of less than 60 ohms/square.

47. The coated article of claim 36, wherein the layer comprising niobium zirconium includes from about 0.1 to 60% zirconium.

48. The coated article of claim 36, wherein the layer comprising niobium zirconium includes from about 0.4 to 10% zirconium.

49. The coated article of claim 1, wherein the layer comprising niobium zirconium includes from about 0.1 to 60% zirconium.

50. The coated article of claim 1, wherein the layer comprising niobium zirconium includes from about 0.4 to 10% zirconium.

51. The coated article of claim 19, wherein the coated article has a visible transmission from about 6 to 80%.

52. The coated article of claim 19, wherein the coated article has a visible transmission of from about 10–50%.

53. The coated article of claim 19, wherein the coated article has a visible transmission of from about 12–30%.

54. The coated article of claim 19, wherein the coated article is a window.

55. The coated article of claim 19, wherein the layer system has a sheet resistance ($R_s$) of less than 250 ohms/square.

56. The coated article of claim 19, wherein the layer system has a sheet resistance ($R_s$) of less than 100 ohms/square.

57. The coated article of claim 19, wherein the layer system has a sheet resistance ($R_s$) of less than 60 ohms/square.

* * * * *